United States Patent
Komedani

(10) Patent No.: US 12,515,614 B2
(45) Date of Patent: Jan. 6, 2026

(54) ELECTRONIC CONTROL UNIT AND COMMUNICATION SYSTEM

(71) Applicant: DENSO CORPORATION, Kariya (JP)

(72) Inventor: Akira Komedani, Kariya (JP)

(73) Assignee: DENSO CORPORATION, Kariya (JP)

( * ) Notice: Subject to any disclaimer, the term of this patent is extended or adjusted under 35 U.S.C. 154(b) by 1091 days.

(21) Appl. No.: 16/990,693

(22) Filed: Aug. 11, 2020

(65) Prior Publication Data
US 2020/0369242 A1 Nov. 26, 2020

Related U.S. Application Data

(63) Continuation of application No. PCT/JP2019/001320, filed on Jan. 17, 2019.

(30) Foreign Application Priority Data

Feb. 13, 2018 (JP) .................................. 2018-023447

(51) Int. Cl.
H04L 9/14 (2006.01)
B60R 25/24 (2013.01)
H04L 9/32 (2006.01)

(52) U.S. Cl.
CPC ................ B60R 25/24 (2013.01); H04L 9/14 (2013.01); H04L 9/32 (2013.01)

(58) Field of Classification Search
CPC .. B60R 25/24; H04L 9/14; H04L 9/32; H04L 2209/84; H04L 9/3242
See application file for complete search history.

(56) References Cited

U.S. PATENT DOCUMENTS

| | | | | |
|---|---|---|---|---|
| 5,606,557 A | * | 2/1997 | Kuroshita | ............... H04L 47/10 370/402 |
| 2009/0037780 A1 | * | 2/2009 | Nakagaki | ............ G06F 11/1402 714/48 |
| 2013/0195272 A1 | | 8/2013 | Nagai et al. | |
| 2013/0312082 A1 | | 11/2013 | Izu et al. | |
| 2016/0125020 A1 | * | 5/2016 | Shaltiel | ............. H04M 1/27453 707/723 |
| 2016/0264071 A1 | | 9/2016 | Ujiie et al. | |

(Continued)

FOREIGN PATENT DOCUMENTS

| | | |
|---|---|---|
| JP | H0698179 A | 4/1994 |
| JP | 2003101528 A | 4/2003 |

(Continued)

*Primary Examiner* — Shewaye Gelagay
*Assistant Examiner* — Carlton Johnson
(74) *Attorney, Agent, or Firm* — Harness, Dickey & Pierce, P.L.C.

(57) ABSTRACT

A communication system includes a transmission-side electronic control unit and a reception-side electronic control unit. In the transmission-side electronic control unit, one key is selected from a plurality of keys in a memory based on synchronization information which is information synchronized in communication between the transmission-side electronic control unit and the reception-side electronic control unit. Further, a message is generated and a message authentication code (MAC) is generated using the selected key. The message to which the message authentication code is added is transmitted to the reception-side electronic control unit.

20 Claims, 7 Drawing Sheets

(56) References Cited

U.S. PATENT DOCUMENTS

| | | | |
|---|---|---|---|
| 2017/0302452 A1 | 10/2017 | Nanjundappa | |
| 2018/0167216 A1* | 6/2018 | Walrant | H04L 9/0894 |
| 2018/0219872 A1 | 8/2018 | Sugashima et al. | |
| 2018/0287796 A1* | 10/2018 | Peper | H04L 9/3242 |

FOREIGN PATENT DOCUMENTS

| | | | |
|---|---|---|---|
| JP | 2003272285 A | 9/2003 | |
| JP | 2004030325 A | 1/2004 | |
| JP | 2010004420 A | 1/2010 | |
| JP | 2016100632 A | 5/2016 | |
| JP | 2017038143 A | 2/2017 | |
| JP | 2017038365 A | 2/2017 | |
| WO | WO-2011145353 A1 | 11/2011 | |
| WO | WO-2012/104978 A1 | 8/2012 | |
| WO | WO-2015170452 A1 | 11/2015 | |

* cited by examiner

FIG. 1

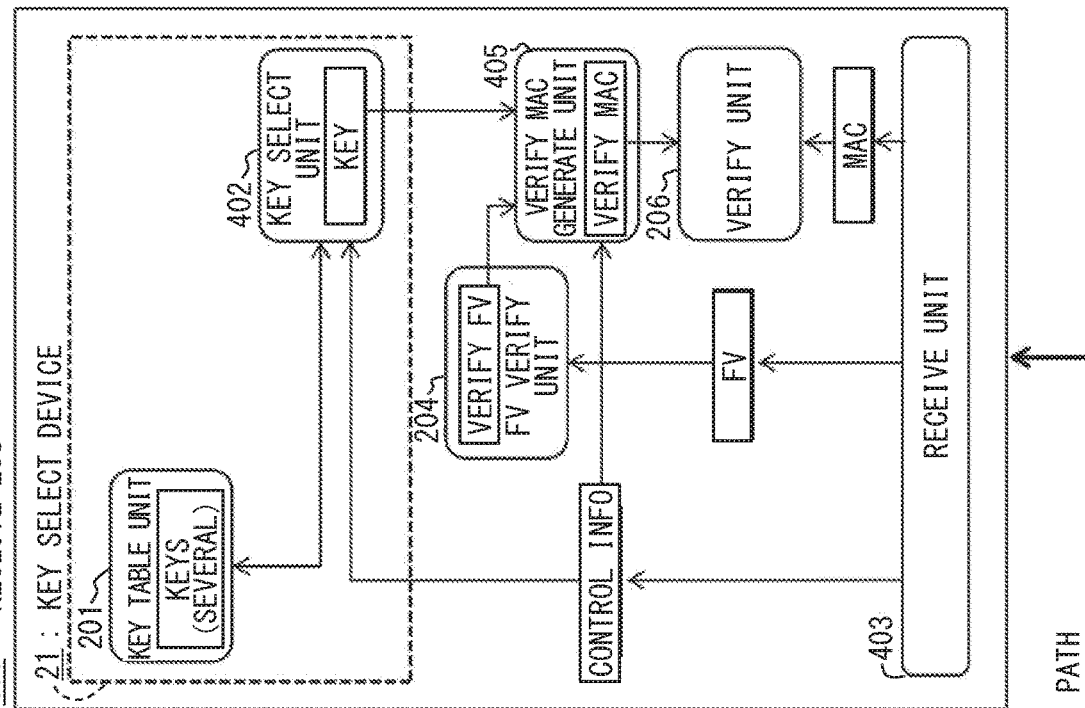
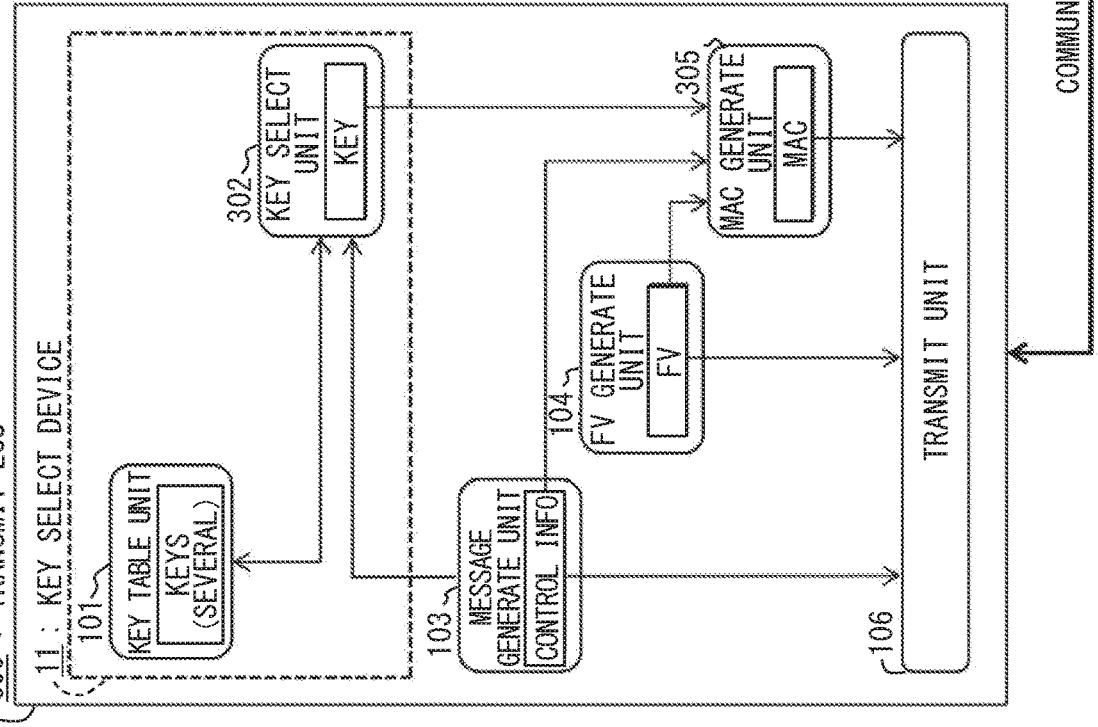
FIG. 5

FIG. 7

ELECTRONIC CONTROL UNIT AND COMMUNICATION SYSTEM

CROSS REFERENCE TO RELATED APPLICATIONS

The present application is a continuation application of International Patent Application No. PCT/JP2019/001320 filed on Jan. 17, 2019, which designated the U.S. and claims the benefit of priority from Japanese Patent Application No. 2018-023447 filed on Feb. 13, 2018. The entire disclosures of all of the above applications are incorporated herein by reference.

TECHNICAL FIELD

The present application relates to selection and switching of an encryption key for ensuring the security of an electronic control unit (ECU: Electric Control Unit), and is mainly used for an electronic control unit mounted on a vehicle.

BACKGROUND

Automobiles have come to use control using electronic control units not only for driving and braking but also for the entire environment inside the vehicle or for communication. Further, regarding driving itself, (i) a safe driving support system, which provides driving support to the driver, and further (ii) an automatic driving system, which does not require the driver itself, have been developed actively. In such situation, hacking of the in-vehicle network to which the electronic control units are connected becomes a serious issue. Once the in-vehicle network is hacked, the safety of automobile driving itself is threatened. Unlike ordinary computer hacking, there is a very high possibility that the human life or body will be directly dangerous. Therefore, various technologies related to security of the in-vehicle electronic control unit have been proposed.

The communication between respective electronic control units uses a message authentication code (MAC) in order to check the integrity of a message, that is, tampering or spoofing. In order to generate and check the message authentication code, the transmission-side electronic control unit and the reception-side electronic control unit use a shared key which is a common key.

SUMMARY

An electronic control unit according to an example of the present disclosure is provided to be a transmission-side electronic unit that transmits a message in a communication system including the transmission-side electronic control unit and a reception-side electronic control unit that receives the message. In the transmission-side electronic control unit, one key is selected from a plurality of keys in a memory based on synchronization information which is information synchronized in communication between the transmission-side electronic control unit and the reception-side electronic control unit. Further, a message is generated and a message authentication code (MAC) is generated using the selected key. The message to which the message authentication code is added is transmitted to the reception-side electronic control unit.

BRIEF DESCRIPTION OF DRAWINGS

The objects, features, and advantages of the present disclosure will become more apparent from the following detailed description made with reference to the accompanying drawings. In the drawings:

FIG. 1 is a block diagram illustrating configurations of a communication system and electronic control units according to a first embodiment;

FIG. 5 is a block diagram illustrating configurations of a communication system and electronic control units according to a second embodiment;

FIG. 7 is a block diagram illustrating configurations of a communication system and electronic control units according to a third embodiment.

DETAILED DESCRIPTION

Figure 2:
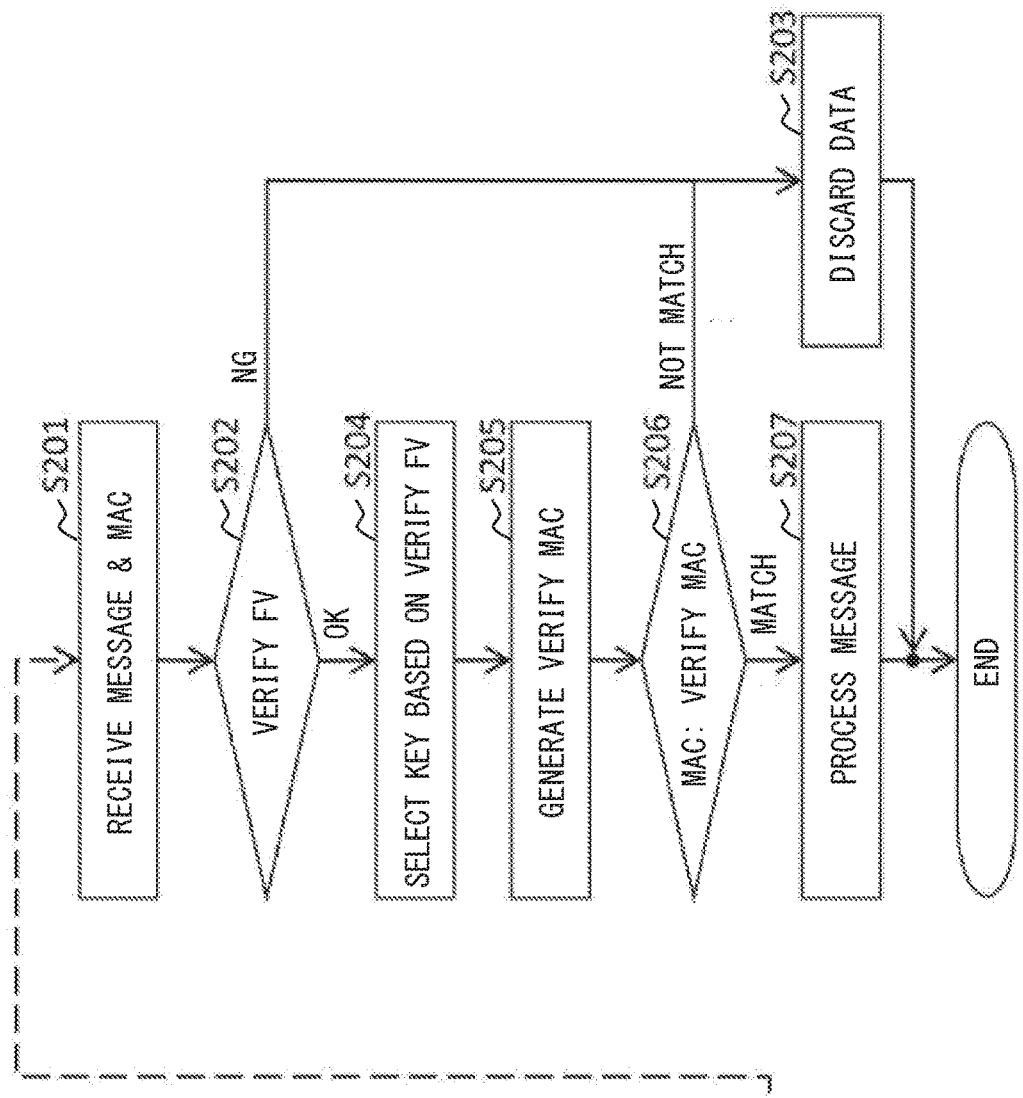
FIG. 2 is a flowchart illustrating operations (message transmission method, message reception method, message transmission program, message reception program) of the communication system and the electronic control units according to the first embodiment.

Hereinafter, embodiments of the present disclosure will be described with reference to the drawings. Note that the present disclosure is not limited to the embodiments below.

The effects described in the embodiments are the effects when the configuration of the embodiment as an example of the present disclosure is included, and are not necessarily the effects that the present disclosure has. When there are a plurality of embodiments, the configuration disclosed in each embodiment is not limited to each embodiment alone, and can be combined across the embodiments. For example, the configuration disclosed in one embodiment may be combined with another embodiment. Further, the disclosed configurations may be collected and combined in each of the plurality of embodiments.

Note that the following embodiments will be described mainly using an in-vehicle electronic control unit for a vehicle as an example, but the present disclosure includes electronic control units and the like other than the in-vehicle use unless otherwise specified.

First Embodiment

1. Configuration of Communication System

Figure 1:
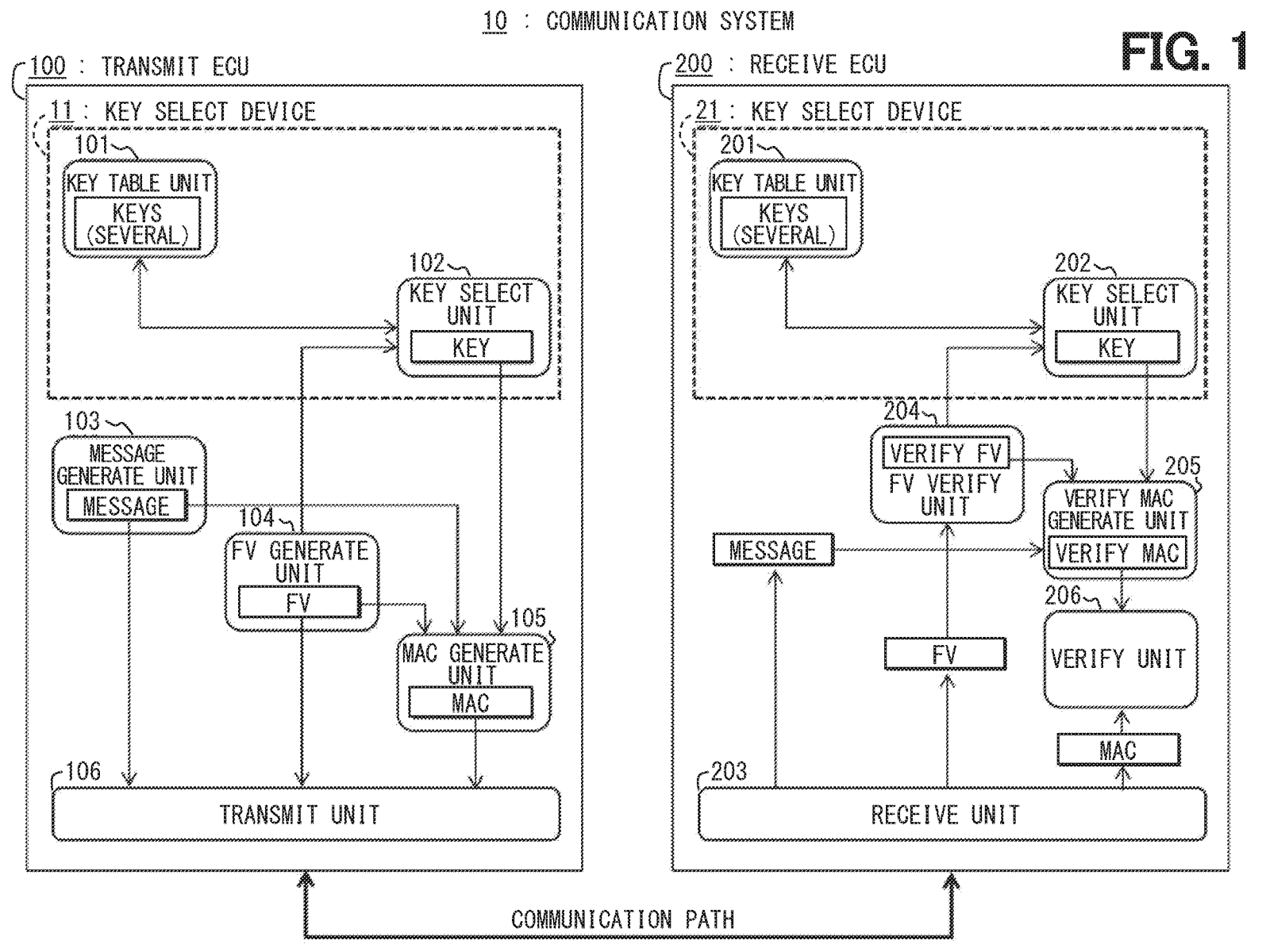

As shown in FIG. 1, a communication system 10 of the present embodiment includes (i) a plurality of electronic control units 100, 200 and (ii) a communication path, which connects the plurality of electronic control units 100, 200. The electronic control units 100, 200 include (i) a transmission-side electronic control unit 100 that transmits a message, and (ii) a reception-side electronic control unit 200 that receives the message. An electronic control unit may also be referred to as an ECU.

Here, the "electronic control unit" of the present disclosure may be any device that can acquire or process information while transmitting or/and receiving information to/from another device. The "electronic control unit" may include the followings in addition to an in-vehicle electronic control unit: a computer (personal computer, built-in microcomputer, etc.), a display device (TV, navigation system, etc.), a recording/playback device (BD, DVD player, SD card reader, etc.), a communication device (cell phone, smartphone, tablet, base station, etc.), a circuit board, a semiconductor module, and a semiconductor. The "electronic control unit" may include all forms of a finished product, semi-finished product, and component.

2. Configuration of Transmission-Side Electronic Control Unit

The transmission-side electronic control unit 100 of this embodiment includes (i) a key table unit 101, (ii) a key selection unit 102, (iii) a message generation unit 103, (iv) an FV generation unit 104, (v) a MAC generation unit 105, and (vi) a transmission unit 106. The transmission-side electronic control unit 100 and/or the individual functional blocks (i.e., units) constituting the transmission-side electronic control unit 100 may be realized as being or including one or more than one electronic controller circuit or processor; such an electronic controller circuit or processor may be implemented (i) by a special-purpose or general-purpose central processing unit (CPU), memory, bus, and program including instructions executed by the CPU by being expanded in the memory, and/or (ii) by dedicated hardware circuits including digital circuits with/without analog circuits such as a module or a circuit board. The same applies to the reception-side electronic control unit 200 described later.

The key table unit 101, which includes a plurality of keys, may be implemented by a memory. The keys may be assumed to use typical common keys. However, other keys may be used; alternatively, a session key may be used.

The key selection unit 102 selects one key from a plurality of keys stored in the key table unit 101 based on a freshness value (FV: Freshness Value) (corresponding to synchronization information) generated by an FV generation unit 104 described later. Such selection is performed according to a predetermined key selection rule. The key selection rule can be realized, for example, by expanding it in a memory and executing it. A specific example of the key selection method will be described later. The selected one key is output to the MAC generation unit 105.

Here, "based on" in the present disclosure only needs to be able to finally select one key from the given synchronization information, and also includes the case where necessary calculation or processing is performed in the process.

Further, the "one key" of the present disclosure may be any key that is used or is scheduled to be used next after a predetermined time. In addition to this, the case of selecting a spare key or a key to be used one after another is naturally included.

The key table unit 101 and the key selection unit 102 are included in the key selection device 11. In this case, the selected key is output from an output unit of the key selection device 11 to the MAC generation unit 105.

The message generation unit 103 generates a message, which is to be transmitted to the reception-side electronic control unit 200. Specific examples of the message include various control information for controlling the vehicle in the case of an in-vehicle electronic control unit mounted on the vehicle. The control information will be described in a second embodiment. In the case of an electronic control unit other than the in-vehicle type, for example, the control information may include detection data detected by a sensor or the like, text data, speech data, and image data.

The FV generation unit 104 generates a freshness value according to the number of times of transmissions of the message, which is generated by the message generation unit 103 and is transmitted by the transmission unit 106 described later. In the present embodiment, a counter value will be mainly described among the freshness values. For example, in the case of CAN which is an in-vehicle network, the freshness value is generated by counting the number of transmissions for each CANID given according to the type of generated control information. For example, when the control information with CAN #1 is transmitted four times, the freshness value of CAN #1 is 4.

Here, the "freshness value (FV)" of the present disclosure is a value having the property of being able to determine whether it is a value used in the past, and includes, for example, a counter value, time information, and a nonce. The counter value is a value indicating the number of times a specific message is transmitted from the transmission-side electronic control unit or the number of times the specific message is received by the reception-side electronic control unit, and is a concept including a sequence number. Further, in addition to the absolute value, the counter value may be a relative value counted from a reference value that is previously set, for instance.

The freshness value is also generated in the reception-side electronic control unit 200 by counting the number of receptions for each CAN ID as described later. The transmission-side electronic control unit 100 and the reception-side electronic control unit 200 thus have the same freshness value. Therefore, the freshness value becomes synchronization information which is information synchronized in the communication between the transmission-side electronic control unit 100 and the reception-side electronic control unit 200.

Here, the "synchronization information" of the present disclosure refers to the same information that can be referred to by both the transmission-side electronic control unit and the reception-side electronic control unit at approximately the same time. Even if the information is different, any information can be used as long as it can derive the same attribute or the same property from the information. When viewed in units of information, the information may be a part of the information in addition to the entire information. Further, other than the case where the content of the information itself is used, it may be the attribute or property of the information, for example, the number of times the information is transmitted/received or the fact that the information is transmitted/received under a predetermined condition.

The MAC generation unit 105 uses (i) the key selected by the key selection unit 102, (ii) the message generated by the message generation unit 103, and (iii) the freshness value generated by the FV generation unit 104, in order to generate a message authentication code (MAC). For example, the message authentication code is generated by applying calculation, based on the MAC algorithm using the selected key, to the data in which the freshness value is inserted or added to the message.

The transmission unit 106 adds the message authentication code generated by the MAC generation unit 105 to the data in which the freshness value generated by the FV generation unit 104 is inserted or added to the message generated by the message generation unit 103, and transmits the data to which the message authentication code is added. This data may be transmitted to a specific reception-side electronic control unit 200 which is designated as a destination, but may be transmitted by broadcasting without designating any destination. As a result, any transmission technique may be used as long as the data can be received by the reception-side electronic control unit 200.

3. Configuration of Reception-Side Electronic Control Unit

The reception-side electronic control unit 200 of this embodiment includes (i) a key table unit 201, (ii) a key selection unit 202, (iii) a reception unit 203, (iii) an FV verification unit 204, (iv) a verification MAC generation unit 205, and (v) a verification unit 206.

The reception unit 203 receives data in which (i) a freshness value is inserted or added to the message transmitted from the transmission-side electronic control unit 100, and (ii) the message authentication code added to the data.

The FV verification unit 204 verifies the identity between the freshness value received by the reception unit 203 and the verification freshness value generated by the reception-side electronic control unit 200. The verification freshness value is generated by counting the number of receptions for each CAN ID added to the control information included in the received message in the case of CAN, which is an in-vehicle network, for example. When the freshness value received by the reception unit 203 and the verification freshness value match, the verification freshness value is output to (i) the key selection unit 202 and (ii) the verification MAC generation unit 205, described later. If they do not match, the received data is discarded.

The FV verification unit 204 may perform the following operation instead of the above operation. In this case, the verification freshness value is defined as a freshness value recorded for each CAN ID included in the most recently received message; the FV verification unit 204 verifies whether the freshness value received by the reception unit 203 is larger than the verification freshness value. If it is larger, the freshness value received by the reception unit 203 is output as a new verification freshness value to the key selection unit 202 and the verification MAC generation unit 205 described later. In this case, since the configuration for counting the number of receptions is not required, the circuit scale can be reduced.

The key table unit 201 includes the same configuration as the key table unit 101 of the transmission-side electronic control unit 100.

The key selection unit 202 includes the same configuration as the key selection unit 102 of the transmission-side electronic control unit 100. Then, the key selection unit 202 selects one key from the plurality of keys stored in the key table unit 201 based on the verification freshness value (corresponding to the synchronization information) generated by the FV verification unit 204. This selection is performed according to a predetermined key selection rule similar to that of the key selection unit 102. The selected one key is output to the verification MAC generation unit 205. Note that the key table unit 201 and the key selection unit 202 are included in the key selection device 21, like in the transmission-side electronic control unit 100. In this case, the selected key is output from an output unit of the key selection device 21 to the verification MAC generation unit 205.

The verification MAC generation unit 205 generates a verification message authentication code using (i) the key selected by the key selection unit 202, (ii) the message received by the reception unit 203, and (iii) the verification freshness value output from the FV verification unit 204. For example, the verification message authentication code is generated by performing calculation on the data in which the verification freshness value is inserted or added to the message based on the MAC algorithm using the selected key.

The verification unit 206 verifies the identity between (i) the message authentication code received by the reception unit 203 and (ii) the verification message authentication code generated by the verification MAC generation unit 205. If the message authentication code and the verification message authentication code match, the received message is processed normally. If they do not match, the received message is discarded.

Note that, in the present embodiment, since the data in which the freshness value is inserted or added to the message is transmitted, it is possible to increase the resistance to the reproduction attack. However, it is not always necessary to insert or add a freshness value to the message. Even if the freshness value is not inserted or added, the transmission-side electronic control unit 100 and the reception-side electronic control unit 200 can select the same key by generating the same freshness value.

According to the transmission-side electronic control unit 100 and the reception-side electronic control unit 200 of the present embodiment described above, another effect can be obtained in addition to the above effect of the present disclosure. That is, the freshness value is used as synchronization information. Therefore, it is of course not necessary to transmit a dedicated synchronization signal as in a known case; the same key can be selected in the transmission-side electronic control unit 100 and the reception-side electronic control unit 200 regardless of whether or not the freshness value itself is transmitted.

4. Message Transmission Method, Message Reception Method, and Program for Executing Method A message transmission method executed by the transmission-side electronic control unit 100 and a message reception method executed by the reception-side electronic control unit 200 will be described with reference to FIG. 2. It should be noted that the order of the processes in FIG. 2 can be appropriately changed unless a certain process is a prerequisite for the next process. The same applies to any of the following embodiments.

The transmission-side electronic control unit 100 executes the following steps. A freshness value that is synchronization information is generated (S101). Based on the freshness value, one key is selected from the plurality of keys stored in the key table unit 101 (S102). A message to be transmitted to the reception-side electronic control unit 200 is generated (S103). A message authentication code is generated using (i) the key selected in S102, (ii) the message generated in S103, and (iii) the freshness value generated in S101 (S104). The message authentication code generated in S104 is added to data including (i) the message generated in S103 and (ii) the freshness value generated in S101; then, the data to which the message authentication code is added is transmitted (S105).

The reception-side electronic control unit 200 executes the following steps. Both of (i) the data including the message and the freshness value transmitted from the transmission-side electronic control unit 100, and (ii) the message authentication code added to the data are received (S201). The freshness value received in S201 is compared (verified) with the verification freshness value generated by the reception-side electronic control unit 200 (S202). If they do not match or the condition is not satisfied, the received data is discarded (S203). If they match or the condition is satisfied in S202, one key is selected from the plurality of keys stored in the key table unit 201 based on the verification freshness value (S204). A verification message authentication code is generated using (i) the key selected in S204, (ii) the message received in S201, and (iii) the verification freshness value (S205). The identity between (i) the message authentication code received in S201 and (ii) the verification message authentication code generated in S205 is verified (S206). If they match, the message is processed normally (S207). If they do not match, the data is discarded (S203).

Note that these methods may be realized in the form of a program that can be executed by a computer.

Here, such a "computer" of the present disclosure only needs to include at least a calculation circuit and a memory, and may be used for any purpose such as general purpose or special purpose. Further, the "computer" may have any form such as a personal computer, a server, a microcomputer, or the like.

According to the message transmission method and the message reception method of the present embodiment described above, another effect may be obtained in addition to the above effect of the present disclosure. That is, the freshness value is verified prior to the verification of the message authentication code, so that the authenticity of the message can be enhanced.

5. Key Selection Device, Key Selection Method, and Key Selection Program

Figure 3A:
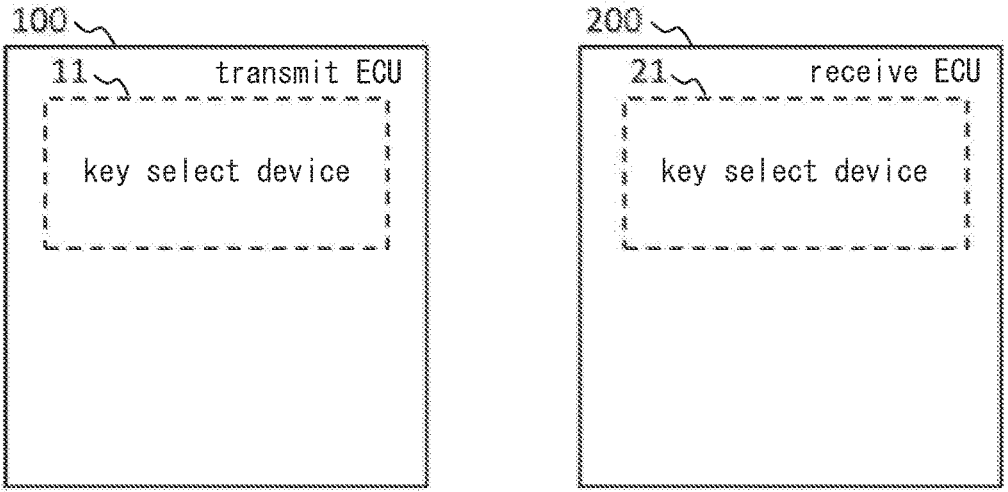
FIG. 3A is a block diagram illustrating an example of a key selection device according to the first embodiment.

In the present embodiment, as shown in FIG. 3A, the key selection device 11 and the key selection device 21 are configured as components included, respectively, in the transmission-side electronic control unit 100 and the reception-side electronic control unit 200. In this case, the key selection device 11 and the key selection device 21 are configured as, for example, semiconductor modules or semiconductors, as components.

Figure 3B:
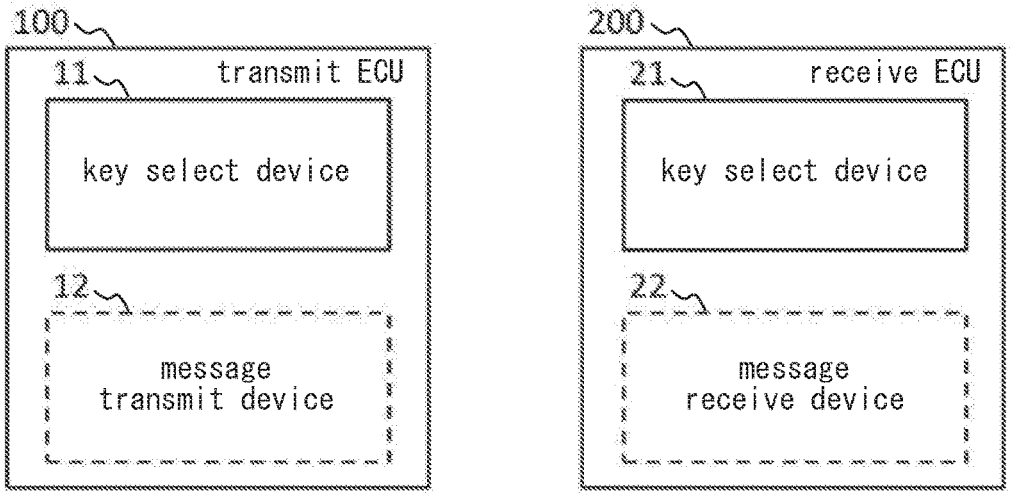
FIG. 3B is a block diagram illustrating an example of a key selection device according to the first embodiment.

In contrast, as shown in FIG. 3B, the key selection device 11 and the key selection device 21 are configured as independent electronic control units, which are connected respectively with a message transmission device 12 and a message reception device 22, to thereby form a transmission-side electronic control unit 100 and a reception-side electronic control unit 200, as a whole. Here, the message transmission device 12 is configured to include a message generation unit 103, an FV generation unit 104, a MAC generation unit 105, and a transmission unit 106; the message reception device 22 is configured to include a reception unit 203, an FV verification unit 204, a verification MAC generation unit 205, and a verification unit 206. In this case, the key selection device 11 and the key selection device 21 can be configured not only as a semiconductor module or a semiconductor as a component but also as an electronic control unit or a circuit board as a finished product or a semi-finished product.

Figure 3C:
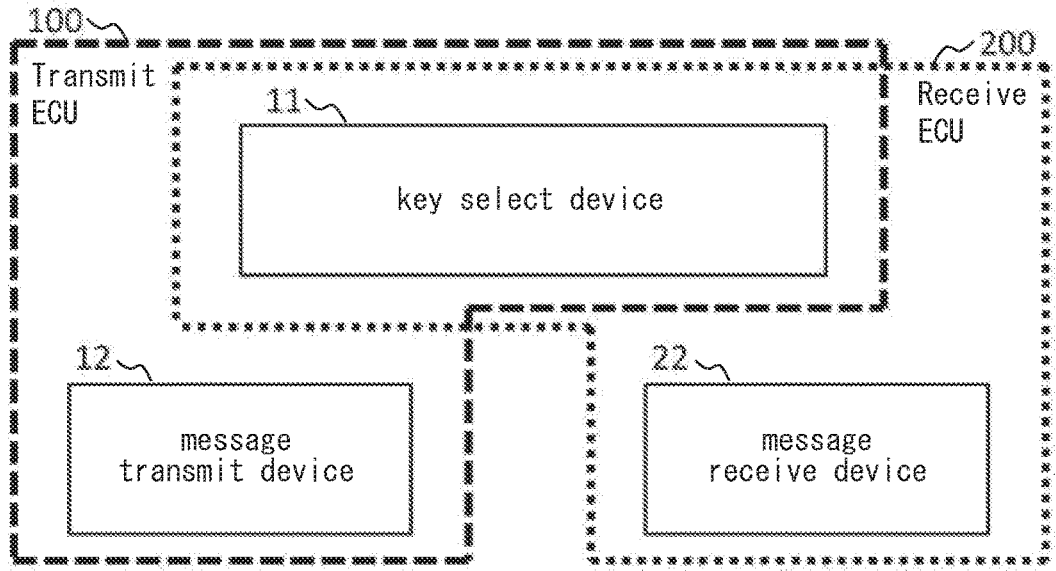
FIG. 3C is a block diagram illustrating an example of a key selection device according to the first embodiment.

Alternatively, as shown in FIG. 3C, the key selection device 11 may be shared by the message transmission device 12 and the message reception device 22. Also in this case, the key selection device 11 can be configured as a component, a finished product, or a semi-finished product.

The key selection method executed by the key selection device 11 and the key selection device 21 may be realized in the form of a computer-executable key selection program.

Here, the "key selection device" of the present disclosure only needs to be able to select one key from a plurality of keys in response to an input, and its form does not matter.

That is, the "key selection device" includes any of a finished product, a semi-finished product, and a component, such as an electronic control unit, a circuit board, a semiconductor module, a semiconductor, and the like.

An entire configuration of each of FIG. 3A, FIG. 3B, and FIG. 3C corresponds to a communication system 10. Further, in FIG. 3C, the key selection device 11 that includes the key table unit 101 and the key selection unit 102 is shared by the transmission side and the reception side. In this configuration, the key table unit 101 and the key selection unit 102 in FIG. 3C can be understood as the key table units 101 and 201 and the key selection units 102 and 202 of the transmission-side electronic control unit 100 and the reception-side electronic control unit 200, respectively.

6. Key Selection Method (Key Selection Rule)

In the present embodiment, the freshness value is used as the synchronization information used for key selection by the key selection unit 102 and the key selection unit 202. The key selection method (key selection rule) will be described in more detail. It should be noted that although the description in the present embodiment assumes that the number of keys included in the key table is two (key 1, key 2), the number of keys may be two or more.

(1) Counter Value

Figure 4A:
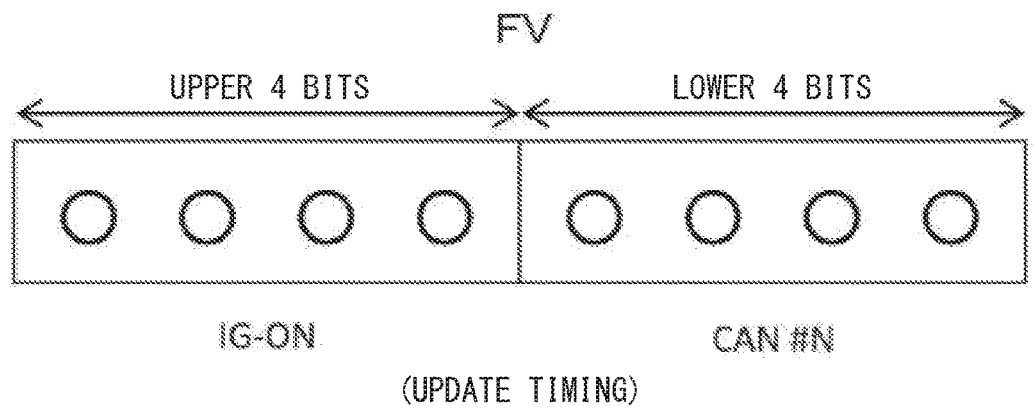
FIG. 4A is an explanatory diagram illustrating a key selection method in a key selection unit according to the first embodiment.

An example of a counter value which is an example of the freshness value is illustrated in FIG. 4A. The counter value consists of 8 bits. Then, the upper four bits count the number of times the ignition is turned on; the lower four bits count the number of times of transmission/reception of a message having a specific CANID.

As an example of the key selection rule, consider a case in which (i) the key 1 is selected when the least significant bit of the upper four bits of the counter value is 0, and (ii) the key 2 is selected when the least significant bit of the upper four bits of the counter value is 1. In this case, the key can be switched every time the ignition is turned on. As another example, consider a case in which (i) the key 1 is selected when the most significant bit of the upper four bits of the counter value is 0, and (ii) the key 2 is selected when the most significant bit of the upper four bits of the counter value is 1. In this case, the key can be switched every time the ignition ON is executed eight times. As another example, consider a case in which (i) the key 1 is selected when the most significant bit of the lower four bits of the counter value is 0, and (ii) the key 2 is selected when the most significant bit of the lower four bits of the counter value is 1. In this case, the key can be switched every time a specific CANID is transmitted and received eight times. Furthermore, these examples may be combined; multiple bits may be used. According to the configuration, it is possible to design various key switching timings.

Figure 4B:
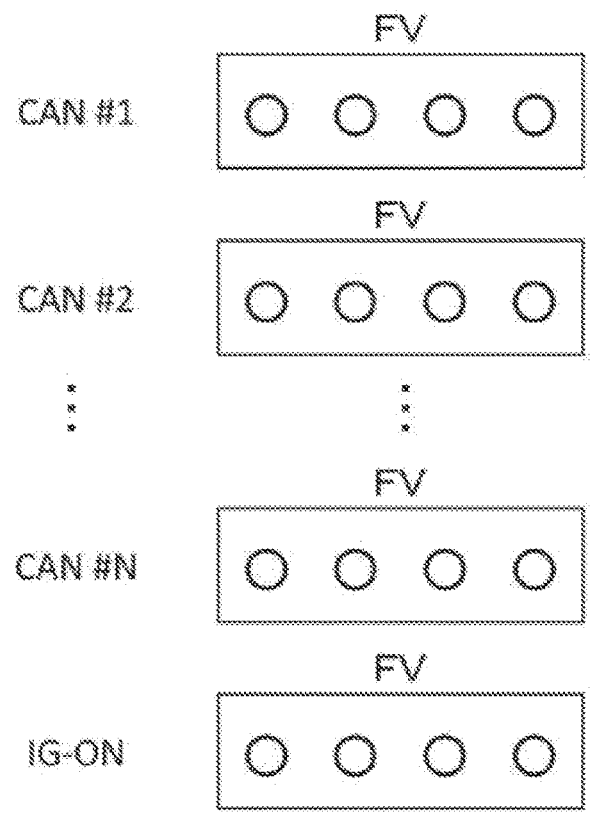
FIG. 4B is an explanatory diagram illustrating a key selection method in a key selection unit according to the first embodiment.

Alternatively, the freshness value for each CANID as shown in FIG. 4B may be used instead of the counter value shown in FIG. 4A. Here, it is assumed that a CANID is assigned to each type of control information. According to this configuration, a key selection rule can be provided for each CANID. For example, a rule may be considered in which the key is switched (i) according to the value of the least significant bit for the message to which CAN #1 is added and (ii) according to the value of the most significant bit for the message to which CAN #2 is added. By thus defining the key selection rule for each CANID, for example, the key switching timing is determined according to the importance of the control information handled by the electronic control unit. The higher the importance of the control information, the earlier the key switching timing can be made.

In this way, the key selection unit 102 and the key selection unit 202 select one key from the key table unit 101 and the key table unit 201 based on the specific bits forming the freshness value.

Here, the "specific bit" of the present disclosure includes a specific plurality of bits in addition to a specific one bit. For example, the upper two bits, the lower four bits, etc. may be used.

(2) Time Information

The synchronization information may use, as an example of the freshness value, time information generated by the transmission-side electronic control unit and the reception-side electronic control unit. For example, by synchronizing the timers of the transmission-side electronic control unit 100 and the reception-side electronic control unit 200, the key may be switched based on each time information or the time information transmitted from the transmission-side electronic control unit 100.

Here, the "time information" of the present disclosure is information indicating time, and examples thereof include time, time stamp, and elapsed time from a reference time. In addition, the time includes the case of including the date information and year information, or the case of including only either the date information or the year information.

(3) Nonce

A nonce, which is an example of a freshness value, may be used as the synchronization information. The nonce is a disposable random value transmitted from the transmission-side electronic control unit 100 to the reception-side electronic control unit 200. Then, the key may be switched based on a specific bit of the nonce, for example.

Second Embodiment

FIG. 5 shows a transmission-side electronic control unit 300 and a reception-side electronic control unit 400, which are included in a communication system 30 of the present embodiment. The same configuration as that of the first embodiment uses the same drawing number. It is assumed that the communication system 30 of the present embodiment and both of the electronic control units 300 on the transmission side and the electronic control unit 400 on the reception side that are included in the communication system 30 are installed in a vehicle.

1. Configuration of Transmission-Side Electronic Control Unit

The transmission-side electronic control unit 300 of this embodiment has the same configuration as the transmission-side electronic control unit 100 of the first embodiment. As a result, the function of each block is as follows.

The message generation unit 103 generates control information for controlling the vehicle as a message. Also, the key selection unit 302 selects one key from the plurality of keys stored in the key table unit 101 based on the control information. That is, in this embodiment, the control information for controlling the vehicle corresponds to the synchronization information.

Here, "controlling the vehicle" in the present disclosure refers to, in addition to the case of controlling the behavior of the vehicle as a whole, the case of controlling the components included in the vehicle (for example, doors, mirrors, airbags, wipers, etc.), and the case of controlling various in-vehicle devices (air conditioners, navigation systems, audio players, etc.). The "control information" of the present disclosure includes, but is not limited to, for example, speed, information regarding opening/closing of the door, information regarding adjustment of the mirror angle, information regarding adjustment of the seat position, and information regarding ON/OFF of the ignition.

The MAC generation unit 305 uses (i) the key selected by the key selection unit 302, (ii) the control information generated by the message generation unit 103, and (iii) the freshness value generated by the FV generation unit 104, to thereby generate a message authentication code (MAC: Message Authentication Code). The transmission unit 306 adds the message authentication code generated by the MAC generation unit 305 to data, which is obtained by inserting or adding the freshness value generated by the FV generation unit 104 onto the control information generated by the message generation unit 103, and then transmits the data to which the message authentication code is added.

2. Configuration of Reception-Side Electronic Control Unit

The reception-side electronic control unit 400 of the present embodiment has the same configuration as the reception-side electronic control unit 200 of the first embodiment. As a result, the function of each block is as follows.

The reception unit 403 receives (i) the data in which the freshness value is inserted or added to the control information and (ii) the message authentication code added to the data, both of which are transmitted from the transmission-side electronic control unit 100. The key selection unit 402 selects one key from the plurality of keys stored in the key table unit 201 based on the received control information.

The verification MAC generation unit 405 uses (i) the key selected by the key selection unit 402, (ii) the control information received by the reception unit 403, and (iii) the verification freshness value output from the FV verification unit 204, to thereby generate a verification message authentication code.

Figure 6:
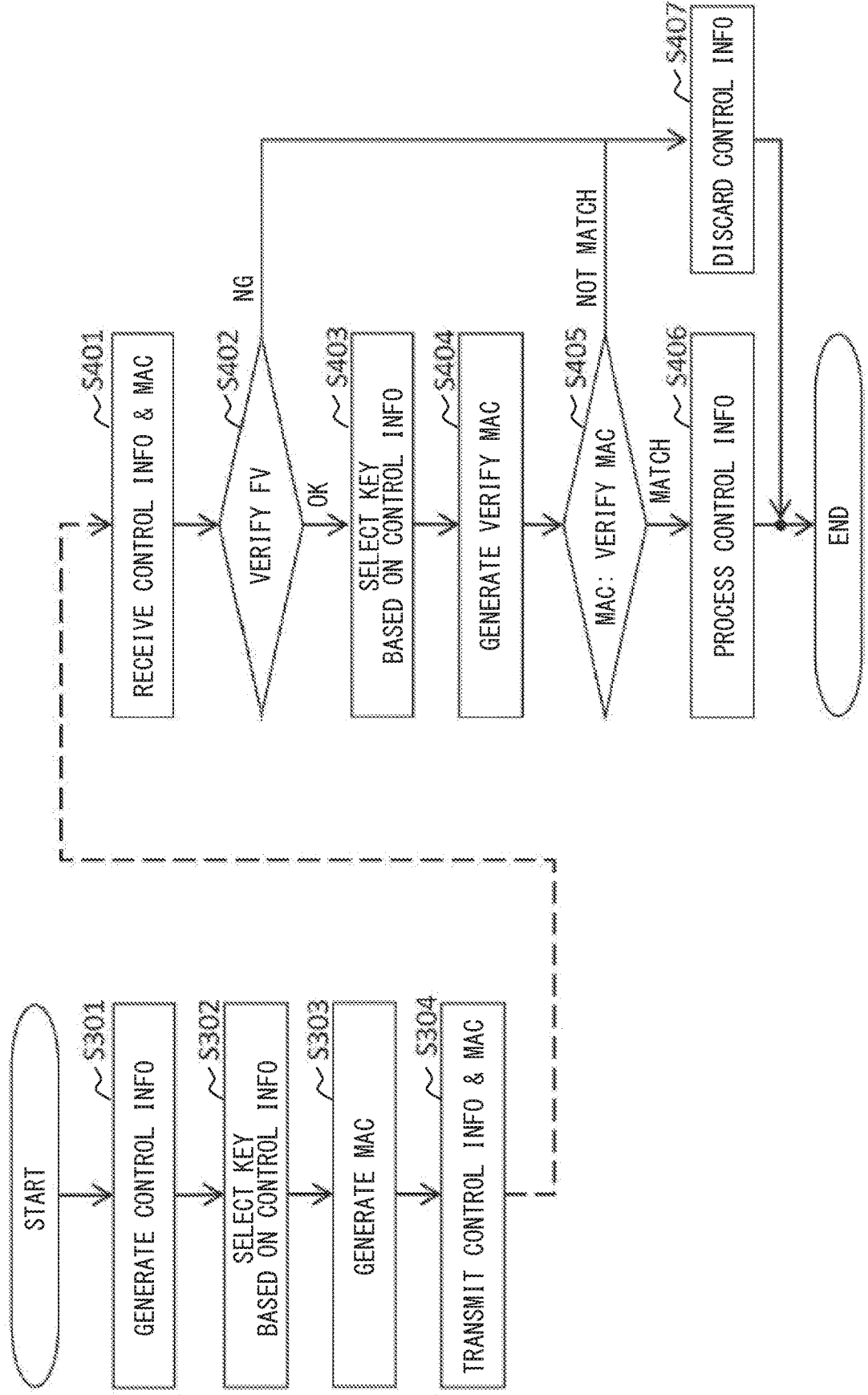
FIG. 6 is a flowchart illustrating operations (message transmission method, message reception method, message transmission program, message reception program) of the communication system and the electronic control units according to the second embodiment.

3. Message Transmission Method, Message Reception Method, and Program for Executing Method A message transmission method executed by the transmission-side electronic control unit 300 and a message reception method executed by the reception-side electronic control unit 400 will be described with reference to FIG. 6.

The transmission-side electronic control unit 300 executes the following steps. Control information, which is a message to be transmitted to the reception-side electronic control unit 400, is generated (S301). Based on the control information generated in S301, one key is selected from the plurality of keys stored in the key table unit 101 (S302). A message authentication code is generated using (i) the key selected in S302, (ii) the control information generated in S301, and (iii) the freshness value (S303). The control information and freshness value generated in S301 are transmitted together with the message authentication code generated in S303 and added thereto (S304).

The reception-side electronic control unit 400 executes the following steps. The control information and the freshness value transmitted from the transmission-side electronic control unit 300, and the message authentication code added to the control information and the freshness value are received (S401). The freshness value received in S401 is compared (verified) with the verification freshness value generated by the reception-side electronic control unit 400 (S402). If they do not match or the condition is not satisfied, the received control information is discarded (S407). If they match or the condition is satisfied in S402, one key is selected from the plurality of keys stored in the key table unit 201 based on the control information (S403).

A verification message authentication code is generated using (i) the key selected in S403, (ii) the control information received in S401, and (iii) the verification freshness value (S404). The identity between (i) the message authentication code received in S401 and (ii) the verification message authentication code generated in S404 is verified (S405). If they match, the control information is processed (S406). If they do not match, the control information is discarded (S407).

4. Key Selection Method (Key Selection Rule)

In the present embodiment, the control information for controlling the vehicle is used as the synchronization information used for the key selection in the key selection unit 302 or the key selection unit 402. The key selection method (key selection rule) will be described in more detail. It should be noted that although the description in this embodiment assumes that the number of keys included in the key table is two (key 1, key 2), the number of keys may be two or more.

(1) Speed Information

As an example of the key selection rule, the key 1 may be selected when the speed becomes equal to or higher than a certain value; in contrast, the key 2 may be selected when the speed becomes equal to or less than the certain value. By selecting and changing the key according to the speed, it is possible to switch the key according to the danger of the vehicle.

(2) Door Opening/Closing Information

As an example of the key selection rule, the key 1 and the key 2 may be switched every time the door is opened and closed a predetermined number of times. Since the vehicle is stopped when the door is opened/closed, it is possible to switch the key when the vehicle is in a safe state and the in-vehicle network is less congested.

(3) Mirror Adjustment Information or Seat Position Adjustment Information

As an example of the key selection rule, the key 1 and the key 2 may be switched when the mirror adjustment is performed or the seat position adjustment is performed. Since these adjustments arise often when the driver has changed, it is possible to practically change the key for each driver.

(4) Other

The key may be selected based on the transmission frequency of the control information transmitted from the transmission-side electronic control unit 300. Here, the "transmission frequency" of the present disclosure refers to the frequency of control information transmitted at a predetermined period of time, and is indicated by the number of times, the cycle, the time, or the like.

According to the transmission-side electronic control unit 300 and the reception-side electronic control unit 400 of the present embodiment described above, another effect may obtained in addition to the above-described effects of the present disclosure. That is, since the control information is used as the synchronization information, it is of course not necessary to transmit a dedicated synchronization signal as in a known art. Further, the same key can be selected in the transmission-side electronic control unit 300 and the reception-side electronic control unit 400 without changing the communication system of the electronic control units mounted on the vehicle.

Third Embodiment

Figure 7:
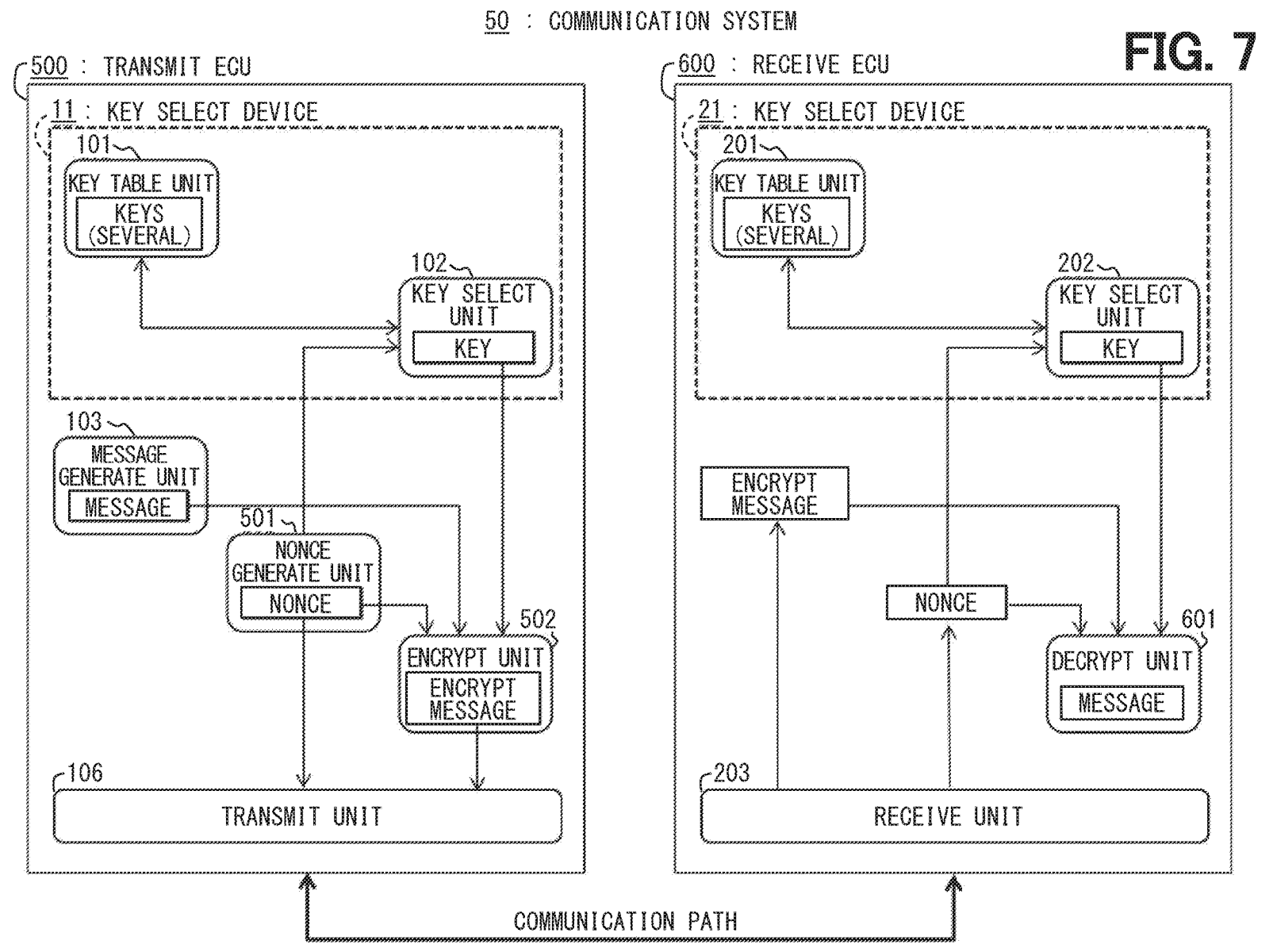

FIG. 7 shows a transmission-side electronic control unit 500 and a reception-side electronic control unit 600 which are included in a communication system 50 of the present embodiment. The same configuration as that of the first embodiment uses the same drawing number. The first and second embodiments disclose an example of message authentication and show an example of using a key for generating a message authentication code. In this embodiment, an example of encryption is disclosed. An example of using a key to encrypt a message to be transmitted and decrypt the encrypted message is shown. The configurations described in the first and second embodiments can of course be combined with the third embodiment as appropriate.

1. Configuration of Transmission-Side Electronic Control Unit

The transmission-side electronic control unit 500 of this embodiment includes (i) a key table unit 101, (ii) a key selection unit 102, (iii) a message generation unit 103, (iv) a nonce generation unit 501, (v) an encryption unit 502, and (vi) a transmission unit 106.

The nonce generation unit 501 generates a nonce that is a disposable random value. In the present embodiment, the nonce is the synchronization information of the present disclosure, but is not limited to this.

The key selection unit 102 selects one key from the plurality of keys stored in the key table unit 101 based on the nonce generated by the nonce generation unit 501.

The encryption unit 502 encrypts the message generated by the message generation unit 103 using the key selected by the key selection unit 102, and generates an encrypted message. The encryption method is freely employed. The message including the nonce may be encrypted.

The transmission unit 106 transmits (i) the encrypted message generated by the encryption unit 502 and (ii) the nonce.

2. Configuration of Reception-Side Electronic Control Unit

The reception-side electronic control unit 600 of this embodiment includes (i) a reception unit 203, (ii) a key table unit 201, (iii) a key selection unit 202, and (iv) a decryption unit 601.

The key selection unit 202 selects one key from the plurality of keys stored in the key table unit 201 based on the nonce received by the reception unit 203.

The decryption unit 601 decrypts the encrypted message using the key selected by the key selection unit 202, and generates the message. The decryption method is freely employed, like in the encryption. The message including the nonce may be decrypted.

According to the transmission-side electronic control unit 500 and the reception-side electronic control unit 600 of the present embodiment described above, it is possible to obtain the above-described effects of the present disclosure and to secure the confidentiality of the message.

Other Embodiments

In the above embodiments, attention is paid to the communication between two electronic control units, but this may be used for three or more electronic control units. For example, when transmitting a message from the ECU 1 to the ECU 2 and the ECU 3, the key selection rule 1 and the key set A may be used between the ECU 1 and the ECU 2, and the key selection rule 2 and the key set B may be used between the ECU 1 and the ECU 3. With this configuration, it is possible to use the key selection rule or the key set according to the reception side ECU or the type of message to be transmitted/received.

Overview

The electronic control unit according to each embodiment of the present disclosure have been described above. The present disclosure can be implemented in the form of a program executed by a computer. A program may be stored in storage areas, in dedicated or general-purpose hardware, such as external storages (hard disk, USB memory, etc.) or internal storages (RAM, ROM, etc.). Such a program may be provided to the above-mentioned dedicated or general-purpose hardware (corresponding to a computer) via a storage medium or via a communication line from a server without using the storage medium. Consequently, when the program is upgraded, the latest function is always provided.

INDUSTRIAL APPLICABILITY

The electronic control unit and the like of the present disclosure have been described by focusing on the electronic control unit mounted on the automobile in each of the embodiments. There is no need to be limited thereto. The present disclosure may also be applied to and includes all moving objects such as motorcycles, ships, railways, airplanes, and the like. Further, the present disclosure is applicable not only to moving objects but also to general products including computers.

For reference to further explain features of the present disclosure, the description is added as follows.

Automobiles have come to use control using electronic control units not only for driving and braking but also for the entire environment inside the vehicle or for communication. Further, regarding driving itself, (i) a safe driving support system, which provides driving support to the driver, and further (ii) an automatic driving system, which does not require the driver itself, have been developed actively. In such situation, hacking of the in-vehicle network to which the electronic control units are connected becomes a serious issue. Once the in-vehicle network is hacked, the safety of automobile driving itself is threatened. Unlike ordinary computer hacking, there is a very high possibility that the human life or body will be directly dangerous. Therefore, various technologies related to security of the in-vehicle electronic control unit have been proposed.

The communication between respective electronic control units uses a message authentication code (MAC) in order to check the integrity of a message, that is, tampering or spoofing. In order to generate and check the message authentication code, the transmission-side electronic control unit and the reception-side electronic control unit use a shared key which is a common key. Authenticity of a message is enhanced by having a plurality of shared keys and switching the shared keys periodically. A method of switching a plurality of keys between the transmission side and the reception side has thus been proposed.

A technology describes that the key be updated by transmitting an update frame on condition that the vehicle is in a predetermined state. Further, another technology describes that keys be collectively updated by transmitting a device key update command from a key management server to a plurality of terminals.

Here, in the technologies, a dedicated synchronization signal is transmitted when updating a key between devices. There may however be a case where network congestion is increasing, or the transmission-side electronic control unit and the reception-side electronic control unit are in different bus domains. In such a case, key switching and message transmission/reception may not be performed sequentially. Before the key of the reception-side electronic control unit has been switched successfully, a message authenticated using the key after switching may be transmitted from the transmission-side electronic control unit. Further, the key switching may fail because the dedicated synchronization signal cannot be received. In such cases, the key on the transmission side and the key on the reception side become different; thus, the reception-side electronic control unit determines that the authentication of the received message is NG (No Good) and discards it.

A detailed study by the inventor has found that there is a high need for reliable key switching in order to control the vehicle stably. This is because, in particular, an in-vehicle network such as a CAN (Controller Area Network) transmits regularly control information for controlling a vehicle in a short time interval.

It is thus desired to provide a configuration, which is provided to switch the keys of a transmission-side electronic control unit and a reception-side electronic control unit without using a dedicated synchronization signal. Such a configuration can reduce the communication failure, which may occur in cases that a dedicated synchronization signal is used, due to (i) the shift of the key switching timing between transmission and reception or (ii) the failure of the key switching.

Aspects of the present disclosure described herein are set forth in the following clauses.

An electronic control unit according to an aspect of the present disclosure is provided to be a transmission-side electronic unit that transmits a message in a communication system including the transmission-side electronic control unit and a reception-side electronic control unit that receives the message. The electronic control unit being the transmission-side electronic control unit includes a key table unit, a key selection unit, a message generation unit, a MAC generation unit, and a transmission unit. The key table unit includes a plurality of keys. The key selection unit is configured to select one key from the key table unit based on synchronization information which is information synchronized in communication between the transmission-side electronic control unit and the reception-side electronic control unit. The message generation unit is configured to generate the message. The MAC generation unit is configured to generate a message authentication code (MAC) using (i) the key selected by the key selection unit and (ii) the message. The transmission unit is configured to transmit the message to which the message authentication code is added.

An electronic control unit according to another aspect of the present disclosure is provided to be a reception-side electronic control unit that receives a message in a communication system including a transmission-side electronic control unit that transmits the message and the reception-side electronic control unit. The electronic control unit being the reception-side electronic control unit includes a reception unit, a key table unit, a key selection unit, a verification MAC generation unit, and a verification unit. The reception unit is configured to receive the message transmitted from the transmission-side electronic control unit and a message authentication code (MAC) added to the message. The key table unit includes a plurality of keys. The key selection unit is configured to select one key from the key table unit based on synchronization information which is information synchronized in communication between the transmission-side electronic control unit and the reception-side electronic control unit. The verification MAC generation unit is configured to generate a verification message authentication code (MAC) using (i) the key selected by the key selection unit and (ii) the message. The verification unit is configured to verify an identity between the message authentication code and the verification message authentication code.

A communication system according to another aspect of the present disclosure is provided to include a transmission-side electronic control unit that transmits a message and a reception-side electronic control unit that receives the message. Herein each of the transmission-side electronic control unit and the reception-side electronic control unit includes a key table unit including a plurality of keys, and a key selection unit configured to select one key from the key table unit based on synchronization information which is information synchronized in communication between the transmission-side electronic control unit and the reception-side electronic control unit. Further, the transmission-side electronic control unit includes a message generation unit configured to generate the message, and a MAC generation unit configured to generate a message authentication code (MAC) using (i) the key selected by the key selection unit and (ii) the message, and a transmission unit configured to transmit the message to which the message authentication code is added. Yet further, the reception-side electronic control unit includes a reception unit configured to receive the message transmitted from the transmission-side electronic control unit and a message authentication code (MAC) added to the message, a verification MAC generation unit configured to generate a verification message authentication code (MAC) using (i) the key selected by the key selection unit and (ii) the message, and a verification unit configured to verify an identity between the message authentication code and the verification message authentication code.

A key selection device according to another aspect of the present disclosure is provided in a communication system including a transmission-side electronic control unit that transmits a message and a reception-side electronic control unit that receives the message. The key selection device includes a key table unit including a plurality of keys, a key selection unit configured to select one key from the key table unit based on synchronization information which is information synchronized in communication between the transmission-side electronic control unit and the reception-side electronic control unit, and an output unit configured to output the one key selected by the key selection unit.

A message transmission method according to another aspect of the present disclosure is provided to be executed in a transmission-side electronic control unit that transmits a message in a communication system including the transmission-side electronic control unit and a reception-side electronic control unit that receives the message. The message transmission method includes (i) selecting one key from a key table unit including a plurality of keys based on synchronization information which is information synchronized in communication between the transmission-side electronic control unit and the reception-side electronic control unit, (ii) generating the message; generating a message authentication code (MAC) using the selected one key and the message, and (iii) transmitting the message and the message authentication code added to the message.

A message reception method according to another aspect of the present disclosure is provided to be executed in a reception-side electronic control unit that receives a message in a communication system including a transmission-side electronic control unit that transmits the message and the reception-side electronic control unit. The message reception method includes (i) receiving the message transmitted from the transmission-side electronic control unit and a message authentication code (MAC) added to the message, (ii) selecting one key from a key table unit including a plurality of keys based on synchronization information which is information synchronized in communication between the transmission-side electronic control unit and the reception-side electronic control unit, (iii) generating a verification message authentication code (MAC) using the selected one key and the message, and (iv) verifying an identity between the message authentication code and the verification message authentication code.

A key selection method according to another aspect of the present disclosure is provided to be used in a communication system including a transmission-side electronic control unit that transmits a message and a reception-side electronic control unit that receives the message. The key selection method includes (i) selecting one key from a key table unit including a plurality of keys based on synchronization information which is information synchronized in communication between the transmission-side electronic control unit and the reception-side electronic control unit, and (ii) outputting the selected one key.

A message transmission program according to another aspect of the present disclosure is provided to be executable by a computer in a transmission-side electronic control unit that transmits a message in a communication system including the transmission-side electronic control unit and a reception-side electronic control unit that receives the message. The message transmission program includes (i) selecting one key from a key table unit including a plurality of keys based on synchronization information which is information synchronized in communication between the transmission-side electronic control unit and the reception-side electronic control unit, (ii) generating the message, (iii) generating a message authentication code (MAC) using the selected one key and the message, and (iv) transmitting the message and the message authentication code added to the message.

A message reception program according to another aspect of the present disclosure is provided to be executable by a computer in a reception-side electronic control unit that receives a message in a communication system including a transmission-side electronic control unit that transmits the message and the reception-side electronic control unit. The message reception program includes (i) receiving the message transmitted from the transmission-side electronic control unit and a message authentication code (MAC) added to the message, (ii) selecting one key from a key table unit including a plurality of keys based on synchronization information which is information synchronized in communication between the transmission-side electronic control unit and the reception-side electronic control unit, (iii) generating a verification message authentication code (MAC) by using the selected one key and the message, and (iv) verifying an identity between the message authentication code and the verification message authentication code.

A key selection program according to another aspect of the present disclosure is provided to be executable by a computer and used in a communication system including a transmission-side electronic control unit that transmits a message and a reception-side electronic control unit that receives the message. The key selection program includes (i) selecting one key from a key table unit including a plurality of keys based on synchronization information which is information synchronized in communication between the transmission-side electronic control unit and the reception-side electronic control unit, and (ii) outputting the selected one key.

An electronic control unit according to another aspect of the present disclosure is provided to be a transmission-side electronic unit that transmits an encrypted message in a communication system including the transmission-side electronic control unit and a reception-side electronic control unit that receives the encrypted message. The electronic control unit being the transmission-side electronic control unit includes a key table unit, a key selection unit, a message generation unit, an encryption unit, and a transmission unit. The key table unit includes a plurality of keys. The key selection unit is configured to select one key from the key table unit based on synchronization information which is information synchronized in communication between the transmission-side electronic control unit and the reception-side electronic control unit. The message generation unit is configured to generate a message. The encryption unit is configured to generate the encrypted message by using (i) the key selected by the key selection unit and (ii) the message. The transmission unit is configured to transmit the encrypted message.

An electronic control unit according to another aspect of the present disclosure is provided to be a reception-side electronic unit that receives an encrypted message in a communication system including a transmission-side electronic control unit that transmits the encrypted message and the reception-side electronic control unit. The electronic control unit being the reception-side electronic control unit includes a reception unit, a key table unit, a key selection unit, and a decryption unit. The reception unit is configured to receive the encrypted message. The key table unit includes a plurality of keys. The key selection unit is configured to select one key from the key table unit based on synchronization information which is information synchronized in communication between the transmission-side electronic control unit and the reception-side electronic control unit. The decryption unit is configured to decrypt the encrypted message using the key selected by the key selection unit.

The above electronic control units, the communication system, the key selection device, a message transmission method, a message reception method, a key selection method, a message transmission program, a message reception program, and a key selection program may hereinafter be collectively referred to as an electronic control unit and the like of the present disclosure. According to the electronic control unit and the like, it is possible to reduce the communication failure, which may occur in cases that a dedicated synchronization signal is used, due to (i) the shift of the key switching timing between transmission and reception or (ii) the failure of the key switching.

What is claimed is:

1. An electronic control unit being a transmission-side electronic control unit that transmits a message in a communication system including the transmission-side electronic control unit and a reception-side electronic control unit having a processor and memory configured to receive the message, the electronic control unit being the transmission-side electronic control unit comprising a processor and memory configured to implement:
   a key table unit including a plurality of keys;
   a key selection unit configured to select one key from the key table unit based on synchronization information which is information synchronized in communication between the transmission-side electronic control unit and the reception-side electronic control unit;
   a message generation unit configured to generate the message;
   a MAC generation unit configured to generate a message authentication code (MAC) using (i) the key selected by the key selection unit, (ii) the synchronization information, and (iii) the message; and
   a transmission unit configured to transmit the message to which the message authentication code is added,
   wherein:
   the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;
   the electronic control unit being the transmission-side electronic control unit is mounted in the vehicle; and
   a key selection rule is defined for each CAN ID, each of freshness values, or each of pieces of the control information, and a key switching timing is determined according to the key selection rule.

2. The electronic control unit according to claim 1, wherein:
   the synchronization information is time information generated by each of the transmission-side electronic control unit and the reception-side electronic unit.

3. The electronic control unit according to claim 1, wherein:
   the synchronization information is a nonce which is a disposable random value transmitted from the transmission-side electronic control unit to the reception-side electronic control unit.

4. The electronic control unit according to claim 1, wherein:
   the key selection unit is configured to select the one key from the key table unit based on a specific bit forming the freshness value.

5. The electronic control unit according to claim 4, wherein:
   the key selection unit is configured to switch the specific bit forming the freshness value according to each type of the transmitted message.

6. The electronic control unit according to claim 4, wherein:
   the specific bit forming the freshness value indicates a counted number of times an ignition switch of the vehicle is turned on.

7. The electronic control unit according to claim 1, wherein:
   the key selection unit is configured to select the one key from the key table unit based on a transmission frequency of the control information transmitted from the electronic control unit being the transmission-side electronic control unit.

8. The electronic control unit according to claim 1, wherein the freshness value is generated by counting a number of transmissions for each CAN ID given according to a type of generated control information.

9. The electronic control unit according to claim 1, wherein the information synchronized in communication between the transmission-side electronic control unit and the reception-side electronic control unit is synchronized based on the key switching timing determined according to the key selection rule.

10. An electronic control unit being a reception-side electronic control unit that receives a message in a communication system including a transmission-side electronic control unit have a processor and memory configured to transmit the message and the reception-side electronic control unit, the electronic control unit being the reception-side electronic control unit comprising a processor and memory configured to implement:
    a reception unit configured to receive the message transmitted from the transmission-side electronic control unit and a message authentication code (MAC) added to the message;
    a key table unit including a plurality of keys;
    a key selection unit configured to select one key from the key table unit based on synchronization information which is information synchronized in communication between the transmission-side electronic control unit and the reception-side electronic control unit;
    a verification MAC generation unit configured to generate a verification message authentication code (MAC) using (i) the key selected by the key selection unit, (ii) the synchronization information, and (iii) the message; and
    a verification unit configured to verify an identity between the message authentication code and the verification message authentication code,
    wherein:
    the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;
    the transmission-side electronic control unit is mounted in the vehicle; and
    a key selection rule is defined for each CAN ID, each of freshness values, or each of pieces of the control information, and a key switching timing is determined according to the key selection rule.

11. A communication system comprising a transmission-side electronic control unit that transmits a message and a reception-side electronic control unit that receives the message,
    wherein each of the transmission-side electronic control unit and the reception-side electronic control unit comprises a processor and memory configured to implement:
    a key table unit including a plurality of keys, and
    a key selection unit configured to select one key from the key table unit based on synchronization information which is information synchronized in communication between the transmission-side electronic control unit and the reception-side electronic control unit,
    wherein the processor and memory of the transmission-side electronic control unit are configured to implement
    a message generation unit configured to generate the message,
    a MAC generation unit configured to generate a message authentication code (MAC) using (i) the key selected by the key selection unit, (ii) the synchronization information, and (iii) the message, and
    a transmission unit configured to transmit the message to which the message authentication code is added,
    wherein the processor and memory of the reception-side electronic control unit includes are configured to implement
    a reception unit configured to receive the message transmitted from the transmission-side electronic control unit and the message authentication code (MAC) added to the message;
    a verification MAC generation unit configured to generate a verification message authentication code (MAC) using (i) the key selected by the key selection unit and (ii) the message; and
    a verification unit configured to verify an identity between the message authentication code and the verification message authentication code,
    wherein:
    the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;
    the transmission-side electronic control unit is mounted in the vehicle; and
    a key selection rule is defined for each CAN ID, each of freshness values, or each of pieces of the control information, and a key switching timing is determined according to the key selection rule.

12. A key selection device in a communication system including a transmission-side electronic control unit having a processor and memory configured to transmit a message and a reception-side electronic control unit having a processor and memory configured to receive the message, the key selection device being implemented by the processor and memory of the transmission-side electronic control unit and comprising:
    a key table unit including a plurality of keys;
    a key selection unit configured to select one key from the key table unit based on synchronization information which is information synchronized in communication between the transmission-side electronic control unit and the reception-side electronic control unit; and
    an output unit configured to output the one key selected by the key selection unit;
    wherein:
    the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;
    the transmission-side electronic control unit is mounted in the vehicle; and
    a key selection rule is defined for each CAN ID, each of freshness values, or each of pieces of the control information, and a key switching timing is determined according to the key selection rule.

13. A computer-implemented message transmission method executed by a computer in a transmission-side electronic control unit that transmits a message in a communication system including the transmission-side electronic control unit and a reception-side electronic control unit that receives the message, the message transmission method comprising:

selecting one key from a key table unit including a plurality of keys based on synchronization information which is information synchronized in communication between the transmission-side electronic control unit and the reception-side electronic control unit;

generating the message;

generating a message authentication code (MAC) using the selected one key, the synchronization information, and the message; and transmitting the message and the message authentication code added to the message, wherein:

the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;

the transmission-side electronic control unit is mounted in the vehicle; and a key selection rule is defined for each CAN ID, each of freshness values, or each of pieces of the control information, and a key switching timing is determined according to the key selection rule.

14. A computer-implemented message reception method executed by a computer in a reception-side electronic control unit that receives a message in a communication system including a transmission-side electronic control unit that transmits the message and the reception-side electronic control unit, the message reception method comprising:

receiving the message transmitted from the transmission-side electronic control unit and a message authentication code (MAC) added to the message; selecting one key from a key table unit including a plurality of keys based on synchronization information which is information synchronized in communication between the transmission-side electronic control unit and the reception-side electronic control unit;

generating a verification message authentication code (MAC) using the selected one key, the synchronization information, and the message; and verifying an identity between the message authentication code and the verification message authentication code, wherein:

the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;

the transmission-side electronic control unit is mounted in the vehicle; and a key selection rule is defined for each CAN ID, each of freshness values, or each of pieces of the control information, and a key switching timing is determined according to the key selection rule.

15. A computer-implemented key selection method executed by a computer and used in a communication system including a transmission-side electronic control unit that transmits a message and a reception-side electronic control unit that receives the message, the key selection method comprising:

selecting one key from a key table unit including a plurality of keys based on synchronization information which is information synchronized in communication between the transmission-side electronic control unit and the reception-side electronic control unit; and outputting the selected one key;

wherein:

the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;

the electronic control unit being the transmission-side electronic control unit is mounted in the vehicle;

a key selection rule is defined for each CAN ID, each of freshness values, or each of pieces of the control information, and a key switching timing is determined according to the key selection rule.

16. A non-transitory computer-readable storage medium comprising a message transmission program including instructions executable by a computer, the instructions performing the computer-implemented message transmission method according to claim 13.

17. A non-transitory computer-readable storage medium comprising a message reception program including instructions executable by a computer, the instructions performing the computer-implemented message reception method according to claim 14.

18. A non-transitory computer-readable storage medium comprising a key selection program including instructions executable by a computer, the instructions performing the computer-implemented key selection method according to claim 15.

19. An electronic control unit being a transmission-side electronic unit that transmits an encrypted message in a communication system including the transmission-side electronic control unit and a reception-side electronic control unit having a processor and memory configured to receive the encrypted message, the electronic control unit being the transmission-side electronic control unit comprising a processor and memory configured to implement:

a key table unit including a plurality of keys;

a key selection unit configured to select one key from the key table unit based on synchronization information which is information synchronized in communication between the transmission-side electronic control unit and the reception-side electronic control unit;

a message generation unit configured to generate a message;

an encryption unit configured to generate the encrypted message by using (i) the key selected by the key selection unit and (ii) the message; and a transmission unit configured to transmit the encrypted message;

wherein:

the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;

the transmission-side electronic control unit is mounted in the vehicle; and a key selection rule is defined for each CAN ID, each of freshness values, or each of pieces of the control information, and a key switching timing is determined according to the key selection rule.

20. An electronic control unit being a reception-side electronic unit that receives an encrypted message in a communication system including a transmission-side electronic control unit having a processor and memory configured to transmit the encrypted message and the reception-side electronic control unit, the electronic control unit being the reception-side electronic control unit comprising a processor and memory configured to implement:

a reception unit configured to receive the encrypted message;

a key table unit including a plurality of keys;

a key selection unit configured to select one key from the key table unit based on synchronization information which is information synchronized in communication between the transmission-side electronic control unit and the reception-side electronic control unit; and a decryption unit configured to decrypt the encrypted message using the key selected by the key selection unit;

wherein:

the synchronization information includes a freshness value (FV) generated specifically for each Controller Area Network (CAN) ID by each of the transmission-side electronic control unit and the reception-side electronic control unit according to a number of receptions and control information including at least one of (i) information to control a vehicle, (ii) information to control a component included in the vehicle, or (iii) information to control an in-vehicle device;

the transmission-side electronic control unit is mounted in the vehicle; and a key selection rule is defined for each CAN ID, each of freshness values, or each of pieces of the control information, and a key switching timing is determined according to the key selection rule.

* * * * *